(12) United States Patent
Shindo et al.

(10) Patent No.: US 7,294,067 B2
(45) Date of Patent: *Nov. 13, 2007

(54) GOLF BALL

(75) Inventors: Jun Shindo, Chichibu (JP); Atsushi Nanba, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/324,297

(22) Filed: Jan. 4, 2006

(65) Prior Publication Data

US 2007/0155540 A1    Jul. 5, 2007

(51) Int. Cl.
*A63B 37/00* (2006.01)

(52) U.S. Cl. ..................................... 473/351

(58) Field of Classification Search ............... 473/351, 473/367, 368
See application file for complete search history.

(56) References Cited

U.S. PATENT DOCUMENTS

| | | | |
|---|---|---|---|
| 6,184,276 B1 | 2/2001 | Ignatz-Hoover | |
| 6,194,505 B1 * | 2/2001 | Sone et al. ............... | 524/432 |
| 6,277,924 B1 | 8/2001 | Hamada et al. | |
| 6,372,847 B1 | 4/2002 | Wouters | |
| 6,596,801 B2 * | 7/2003 | Higuchi et al. .......... | 524/432 |
| 6,602,941 B2 | 8/2003 | Higuchi et al. | |
| 6,634,961 B2 | 10/2003 | Higuchi et al. | |
| 6,695,716 B2 | 2/2004 | Higuchi et al. | |
| 6,712,715 B2 | 3/2004 | Higuchi et al. | |
| 6,786,836 B2 | 9/2004 | Higuchi et al. | |
| 6,795,172 B2 | 9/2004 | Putman et al. | |
| 6,818,705 B2 | 11/2004 | Wu et al. | |
| 6,841,642 B2 | 1/2005 | Kaszas | |
| 6,921,345 B2 | 7/2005 | Higuchi et al. | |
| 6,923,735 B1 * | 8/2005 | Hayashi ................... | 473/376 |
| 2004/0147694 A1 | 7/2004 | Sone et al. | |
| 2005/0148723 A1 | 7/2005 | Kondou | |

FOREIGN PATENT DOCUMENTS

| | | |
|---|---|---|
| JP | 7-268132 A | 10/1995 |
| JP | 11-35633 A | 2/1999 |
| JP | 2002-355336 A | 12/2002 |
| JP | 2002-355337 A | 12/2002 |
| JP | 2002-355338 A | 12/2002 |
| JP | 2002-355339 A | 12/2002 |
| JP | 2002-355340 A | 12/2002 |
| JP | 2002-356581 A | 12/2002 |
| JP | 2004-292667 A | 10/2004 |
| WO | WO 2003/082925 | 10/2003 |

OTHER PUBLICATIONS

"Hydrolysis of Tri-tert-butylaluminum" by Mason et al., J. American Chemical Society, vol. 115, pp. 4971-4984 (1993).
"Three-Coordinate Aluminum Is Not a Prerequisite for Catalytic Activity in the Zirconocene-Alumoxane Polymerization of Ethylene", by Harlen et al, J. American Chemical Society, vol. 117, pp. 6465-6474, (1995).

* cited by examiner

*Primary Examiner*—Raeann Trimiew
(74) *Attorney, Agent, or Firm*—Sughrue Mion, PLLC

(57) ABSTRACT

A golf ball having, as a constituent element, an article molded under heat from a rubber composition which includes: (a) a base rubber containing polybutadiene having a stress relaxation time ($T_{80}$), defined as the time in seconds from the moment when rotor rotation is stopped immediately after measurement of the $ML_{1+4}$ (100° C.) value (the Mooney viscosity measured at 100° C. in accordance with ASTM D-1646-96) that is required for the $ML_{1+4}$ value to decrease 80%, of at most 3.5, (b) an unsaturated carboxylic acid and/or a metal salt thereof, and (c) an organic peroxide. The golf ball has an excellent rebound.

5 Claims, No Drawings

GOLF BALL

BACKGROUND OF THE INVENTION

The present invention relates to a golf ball having an excellent rebound.

Efforts to provide golf balls with an excellent rebound have until now focused on one or more indicator of the polybutadiene used as the base rubber, such as the Mooney viscosity, polymerization catalyst, solvent viscosity and molecular weight distribution, and attempted to optimize these indicators. See, for example, Patent Document 1: JP-A 2004-292667; Patent Document 2: U.S. Pat. No. 6,818,705; Patent Document 3: JP-A 2002-355336; Patent Document 4: JP-A 2002-355337; Patent Document 5: JP-A 2002-355338; Patent Document 6: JP-A 2002-355339; Patent Document 7: JP-A 2002-355340; and Patent Document 8: JP-A 2002-356581.

For example, Patent Document 1 (JP-A 2004-292667) describes, as a base rubber for golf balls, a polybutadiene having a Mooney viscosity of 30 to 42 and a molecular weight distribution (Mw/Mn) of 2.5 to 3.8. Patent Document 2 (U.S. Pat. No. 6,818,705) describes, for the same purpose, a polybutadiene having a molecular weight of at least 200,000 and a resilience index of at least 40.

However, many golfers desire golf balls capable of achieving a longer distance, and so a need exists for the development of golf balls having an even better rebound.

SUMMARY OF THE INVENTION

It is therefore an object of the present invention to provide a golf ball having an excellent rebound.

As a result of extensive investigations, I have found that, in the production of a golf ball having, as a constituent element, an article molded under heat from a rubber composition which includes a base rubber, an unsaturated carboxylic acid and/or a metal salt thereof, and an organic peroxide, by including within the base rubber a polybutadiene having a specific $T_{80}$ value, a hot-molded article having an excellent rebound can be obtained from the rubber composition. Moreover, golf balls in which such a hot-molded article serves as a constituent element are endowed with an excellent rebound.

Accordingly, the invention provides the following solid golf balls.

[1] A golf ball comprising, as a constituent element, an article molded under heat from a rubber composition comprised of: (a) a base rubber containing polybutadiene having a stress relaxation time ($T_{80}$), defined as the time in seconds from the moment when rotor rotation is stopped immediately after measurement of the $ML_{1+4}$ (100° C.) value (the Mooney viscosity measured at 100° C. in accordance with ASTM D-1646-96) that is required for the $ML_{1+4}$ value to decrease 80%, of at most 3.5, (b) an unsaturated carboxylic acid and/or a metal salt thereof, and (c) an organic peroxide.

[2] The golf ball [1] above, wherein the rubber composition additionally comprises (d) an organosulfur compound.

[3] The golf ball of [1] above, wherein the polybutadiene having a stress relaxation time ($T_{80}$) of at most 3.5 accounts for at least 40 wt % of the base rubber.

[4] The golf ball of [1] above, wherein the polybutadiene having a stress relaxation time ($T_{80}$) of at most 3.5 is a polybutadiene prepared using a rare-earth catalyst.

[5] The golf ball of [1] above, wherein the polybutadiene having a stress relaxation time ($T_{80}$) of at most 3.5 is a polybutadiene prepared by polymerization using a rare-earth catalyst, followed by terminal modification.

DETAILED DESCRIPTION OF THE INVENTION

The invention is described more fully below. The golf ball of the invention is a golf ball having, as a constituent element, an article molded under heat from a rubber composition which includes the following components (a) to (c):

(a) a base rubber containing polybutadiene having a stress relaxation time ($T_{80}$), as defined below, of at most 3.5,
(b) an unsaturated carboxylic acid and/or a metal salt thereof, and
(c) an organic peroxide.

The stress relaxation time ($T_{80}$) is the time in seconds, from the moment when rotor rotation is stopped immediately after measurement of the $ML_{1+4}$ (100° C.) value (the Mooney viscosity measured at 100° C. in accordance with ASTM D-1646-96), that is required for the $ML_{1+4}$ value to decrease 80%.

The term "Mooney viscosity" used herein refers to an industrial indicator of viscosity as measured with a Mooney viscometer, which is a type of rotary plastometer. The unit symbol used is $ML_{1+4}$ (100° C.), where "M" stands for Mooney viscosity, "L" stands for large rotor (L-type), "1+4" stands for a pre-heating time of 1 minute and a rotor rotation time of 4 minutes, and "100° C." indicates that measurement was carried out at a temperature of 100° C.

In the practice of the invention, the polybutadiene included in above component (a) is a polybutadiene (BR1) having a stress relaxation time ($T_{80}$) of at most 3.5. The $T_{80}$ value is preferably 3.0 or less, more preferably 2.8 or less, and most preferably 2.5 or less. The lower limit of $T_{80}$ value is preferably 1 or more, and most preferably 1.5 or more. At a $T_{80}$ value of more than 3.5, the objects of the invention cannot be attained. On the other hand, if the $T_{80}$ value is too small, problems may arise with workability.

The polybutadiene BR1 has a Mooney viscosity ($ML_{1+4}$ (100° C.)) which, while not subject to any particular limitation, is preferably at least 20 but not more than 80.

It is recommended that the polybutadiene BR1 have a cis-1,4 bond content of at least 60%, preferably at least 80%, more preferably at least 90%, and most preferably at least 95%, and a 1,2-vinyl bond content of at most 2%, preferably at most 1.7%, more preferably at most 1.5%, and most preferably at most 1.3%. At a cis-1,4 bond content or a 1,2-vinyl bond content outside of these ranges, the rebound may decrease.

From the standpoint of rebound, it is preferable for the polybutadiene BR1 in the invention to be a polybutadiene synthesized using a rare-earth catalyst.

A known rare-earth catalyst may be used for this purpose. Exemplary rare-earth catalysts include those made up of a combination of a lanthanide series rare-earth compound, an organoaluminum compound, an alumoxane, a halogen-bearing compound, and an optional Lewis base.

Examples of suitable lanthanide series rare-earth compounds include halides, carboxylates, alcoholates, thioalcoholates and amides of atomic number 57 to 71 metals.

Organoaluminum compounds that may be used include those of the formula $AlR^1R^2R^3$ (wherein $R^1$, $R^2$ and $R^3$ are each independently a hydrogen or a hydrocarbon group of 1 to 8 carbons).

Preferred alumoxanes include compounds of the structures shown in formulas (I) and (II) below. The alumoxane association complexes described in *Fine Chemical* 23, No.

9, 5 (1994), *J. Am. Chem. Soc.* 115, 4971 (1993), and *J. Am. Chem. Soc.* 117, 6465 (1995) are also acceptable.

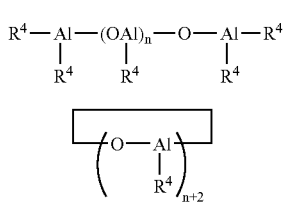

(I)

(II)

In the above formulas, $R^4$ is a hydrocarbon group having 1 to 20 carbon atoms, and n is 2 or a larger integer.

Examples of halogen-bearing compounds that may be used include aluminum halides of the formula $AlX_nR_{3-n}$ (wherein X is a halogen; R is a hydrocarbon group of 1 to 20 carbons, such as an alkyl, aryl or aralkyl; and n is 1, 1.5, 2 or 3); strontium halides such as $Me_3SrCl$, $Me_2SrCl_2$, $MeSrHCl_2$ and $MeSrCl_3$; and other metal halides such as silicon tetrachloride, tin tetrachloride and titanium tetrachloride.

The Lewis base can be used to form a complex with the lanthanide series rare-earth compound. Illustrative examples include acetylacetone and ketone alcohols.

In the practice of the invention, the use of a neodymium catalyst in which a neodymium compound serves as the lanthanide series rare-earth compound is particularly advantageous because it enables a polybutadiene rubber having a high cis-1,4 bond content and a low 1,2-vinyl bond content to be obtained at an excellent polymerization activity. Preferred examples of such rare-earth catalysts include those mentioned in JP-A 11-35633.

The polymerization of butadiene in the presence of a rare-earth catalyst may be carried out by bulk polymerization or vapor phase polymerization, either with or without the use of solvent, and at a polymerization temperature in a range of generally from –30 to +150° C., and preferably from 10 to 100° C.

To manufacture golf balls having a stable quality, it is desirable for the above-described polybutadiene BR1 in the invention to be a terminal-modified polybutadiene obtained by polymerization using the above-described rare-earth catalyst, followed by the reaction of a terminal modifier with active end groups on the polymer.

A known terminal modifier may be used for this purpose. Illustrative examples include compounds of types (1) to (6) below.

(1) Halogenated organometallic compounds, halogenated metallic compounds and organometallic compounds of the general formulas $R^5_nM'X_{4-n}$, $M'X_4$, $M'X_3$, $R^5_nM'$, $(—R^6—COOR^7)_{4-n}$ or $R^5_nM'(—R^6—COR^7)_{4-n}$ (wherein $R^5$ and $R^6$ are each independently a hydrocarbon group of 1 to 20 carbons; $R^7$ is a hydrocarbon group of 1 to 20 carbons which may contain pendant carbonyl or ester groups; M' is a tin, silicon, germanium or phosphorus atom; X is a halogen atom; and n is an integer from 0 to 3);

(2) heterocumulene compounds having on the molecule a Y=C=Z linkage (wherein Y is a carbon, oxygen, nitrogen or sulfur atom; and Z is an oxygen, nitrogen or sulfur atom);

(3) three-membered heterocyclic compounds containing on the molecule the following bonds

(wherein Y is an oxygen, nitrogen or sulfur atom);

(4) halogenated isocyano compounds;

(5) carboxylic acids, acid halides, ester compounds, carbonate compounds and acid anhydrides of the formula $R^8—(COOH)_m$, $R^9(COX)_m$, $R^{10}—(COO—R^{11})$, $R^{12}—OCOO—R^{13}$ $R^{14}—(COOCO—R^{15})_m$ or

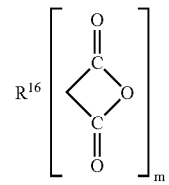

(wherein $R^8$ to $R^{16}$ are each independently a hydrocarbon group of 1 to 50 carbons, X is a halogen atom, and m is an integer from 1 to 5); and (6) carboxylic acid metal salts of the formula $R^{17}_1M''(OCOR^{18})_{4-1}$, $R^{19}_1M''(OCO—R^{20}—COOR^{21})_{4-1}$ or

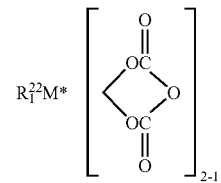

(wherein $R^{17}$ to $R^{23}$ are each independently a hydrocarbon group of 1 to 20 carbons, M'' is a tin, silicon or germanium atom, and the letter 1 is an integer from 0 to 3).

Specific examples of the above terminal modifiers (1) to (6) and methods for their reaction are described in, for example, JP-A 11-35633 and JP-A 7-268132.

In the practice of the invention, the above-described polybutadiene BR1 is included within the base rubber and accounts for preferably at least 40 wt %, more preferably at least 50 wt %, even more preferably at least 60 wt %, and even up to 100 wt %, of the base rubber. If this proportion is too low, the rebound may decrease.

No particular limitation is imposed on rubber compounds other than BR1 which may be included in the base rubber. For example, polybutadiene rubbers having a stress relaxation time $T_{80}$ of more than 3 may be included, as can also other rubber compounds such as styrene-butadiene rubbers (SBR), natural rubbers, polyisoprene rubbers and ethylene-propylene-diene rubbers (EPDM). These may be used individually or as combinations of two or more.

The Mooney viscosity of such additional rubbers included in the base rubber, while not subject to any particular limitation, is typically at least 20 but not more than 80.

Rubbers synthesized with a group VIII catalyst may be used as such additional rubbers included in the base rubber. Exemplary group VIII catalysts include the following nickel catalysts and cobalt catalysts.

Examples of suitable nickel catalysts include single-component systems such as nickel-kieselguhr, binary systems such as Raney nickel/titanium tetrachloride, and ternary systems such as nickel compound/organometallic compound/boron trifluoride etherate. Exemplary nickel compounds include reduced nickel on a carrier, Raney nickel, nickel oxide, nickel carboxylate and organonickel complex salts. Exemplary organometallic compounds include trialkylaluminum compounds such as triethylaluminum, tri-n-propylaluminum, triisobutylaluminum and tri-n-hexylaluminum; alkyllithium compounds such as n-butyllithium, sec-butyllithium, tert-butyllithium and 1,4-dilithiumbutane; and dialkylzinc compounds such as diethylzinc and dibutylzinc.

Examples of suitable cobalt catalysts include cobalt and cobalt compounds such as Raney cobalt, cobalt chloride, cobalt bromide, cobalt iodide, cobalt oxide, cobalt sulfate, cobalt carbonate, cobalt phosphate, cobalt phthalate, cobalt carbonyl, cobalt acetylacetonate, cobalt diethyldithiocarbamate, cobalt anilinium nitrite and cobalt dinitrosyl chloride. It is particularly advantageous to use these compounds in combination with, for example, a dialkylaluminum monochloride such as diethylaluminum monochloride or diisobutylaluminum monochloride; a trialkylaluminum such as triethylaluminum, tri-n-propylaluminum, triisobutylaluminum or tri-n-hexylaluminum; an alkylaluminum sesquichloride such as ethylaluminum sesquichloride; or aluminum chloride.

Polymerization using the above group VIII catalysts, and particularly a nickel or cobalt catalyst, can be carried out by a process in which the catalyst typically is continuously charged into a reactor together with a solvent and butadiene monomer, and the reaction conditions are suitably selected, such as a reaction temperature in a range of 5 to 60° C. and a reaction pressure in a range of atmospheric pressure to 70 plus atmospheres, so as to yield a product having the above-indicated Mooney viscosity.

Above component (b) may be an unsaturated carboxylic acid, specific examples of which include acrylic acid, methacrylic acid, maleic acid and fumaric acid. Acrylic acid and methacrylic acid are especially preferred. Alternatively, it may be the metal salt of an unsaturated carboxylic acid, examples of which include the zinc and magnesium salts of unsaturated fatty acids such as zinc methacrylate and zinc acrylate. The use of zinc acrylate is especially preferred.

It is recommended that the content of above component (b) per 100 parts by weight of the base rubber be at least 10 parts by weight, and preferably at least 15 parts by weight, but not more than 60 parts by weight, preferably not more than 50 parts by weight, even more preferably not more than 45 parts by weight, and most preferably not more than 40 parts by weight. Too much component (b) will make the article molded under heat from the rubber composition too hard, giving the golf ball an unpleasant feel on impact. On the other hand, too little will result in a lower rebound.

Above component (c) may be a commercially available product, suitable examples of which include Percumyl D (produced by NOF Corporation), Perhexa 3C (NOF Corporation) and Luperco 231XL (Atochem Co.). If necessary, a combination of two or more different organic peroxides may be used.

It is recommended that the amount of component (c) per 100 parts by weight of the base rubber be at least 0.1 part by weight, and preferably at least 0.3 part by weight, but not more than 5 parts by weight, preferably not more than 4 parts by weight, more preferably not more than 3 parts by weight, and most preferably not more than 2 parts by weight. Too much or too little component (c) may make it impossible to obtain a suitable hardness distribution, resulting in a poor feel on impact, durability and rebound.

To further improve rebound, it is desirable for the rubber composition in the invention to include also the following component (d):

(d) an organosulfur compound.

Examples of such organosulfur compounds include thiophenols, thionaphthols, halogenated thiophenols, and metal salts thereof. Specific examples include the zinc salts of pentachlorothiophenol, pentafluorothiophenol, pentabromothiophenol and p-chlorothiophenol; and diphenylpolysulfides, dibenzylpolysulfides, dibenzoylpolysulfides, dibenzothiazoylpolysulfides and dithiobenzoylpolysulfides having 2 to 4 sulfurs. These may be used singly or as combinations of two or more thereof. Diphenyldisulfide and the zinc salt of pentachlorothiophenol are especially preferred.

It is recommended that the amount of component (d) included per 100 parts by weight of the base rubber be at least 0.1 part by weight, preferably at least 0.2 part by weight, and more preferably at least 0.5 part by weight, but not more than 5 parts by weight, preferably not more than 4 parts by weight, and more preferably not more than 3 parts by weight. Too much organosulfur compound may make the article molded under heat from the rubber composition too soft, whereas too little may make an improved rebound difficult to achieve.

The rubber composition in the invention may additionally include such additives as inert fillers and antioxidants. Illustrative examples of suitable inert fillers include zinc oxide, barium sulfate and calcium carbonate. The amount included per 100 parts by weight of the base rubber is generally at least 5 parts by weight, preferably at least 7 parts by weight, even more preferably at least 10 parts by weight, and most preferably at least 13 parts by weight, but generally not more than 80 parts by weight, preferably not more than 50 parts by weight, more preferably not more than 45 parts by weight, and most preferably not more than 40 parts by weight. Too much or too little inorganic filler may make it impossible to obtain a proper golf ball weight and a suitable rebound.

To increase the rebound, it is desirable for the inorganic filler to include zinc oxide in an amount of at least 50 wt %, preferably at least 75 wt %, and most preferably 100 wt % (the zinc oxide being 100% of the inorganic filler).

The zinc oxide has an average particle size (by air permeametry) of preferably at least 0.01 μm, more preferably at least 0.05 μm, and most preferably at least 0.1 μm, but preferably not more than 2 μm, and more preferably not more than 1 μm.

Examples of suitable commercial antioxidants include 2,2'-methylenebis(4-methyl-6-t-butylphenol) (Nocrac NS-6, available from Ouchi Shinko Chemical Industry Co., Ltd.) and 2,2'-methylenebis(4-ethyl-6-t-butylphenol) (Nocrac NS-5, Ouchi Shinko Chemical Industry Co., Ltd.). To achieve a good rebound and durability, it is recommended that the amount of antioxidant included per 100 parts by weight of the base rubber be more than 0 part by weight, preferably at least 0.05 part by weight, more preferably at least 0.1 part by weight, and most preferably at least 0.2 part by weight, but not more than 3 parts by weight, preferably not more than 2 parts by weight, more preferably not more than 1 part by weight, and most preferably not more than 0.5 part by weight.

The article molded under heat from the rubber composition in the present invention can be obtained by vulcanizing and curing the rubber composition using a method of the same sort as that used on prior-art rubber compositions for golf balls. Vulcanization may be carried, for example, at a temperature of from 100 to 200° C. for a period of 10 to 40 minutes.

It is recommended that the article molded under heat from the rubber composition in the invention have a hardness difference, obtained by subtracting the JIS-C hardness at the center of the hot-molded article from the JIS-C hardness at the surface of the article, of at least 15, preferably at least 16, more preferably at least 17, and even more preferably at least 18, but not more than 50, and preferably not more than 40. Setting the hardness within this range is desirable for achieving a golf ball having a soft feel and a good rebound and durability.

It is recommended that the hot-molded article obtained from the rubber composition in the invention, regardless of which of the subsequently described golf balls in which it is used, have a deflection when subjected to loading from an initial load of 98 N (10 kgf) to a final load of 1275 N (130 kgf), of at least 2.0 mm, preferably at least 2.5 mm, and more preferably at least 2.8 mm, but not more than 6.0 mm, preferably not more than 5.5 mm, even more preferably not more than 5.0 mm, and most preferably not more than 4.5 mm. Too small a deflection may worsen the feel of the ball on impact and, particularly on long shots such as with a driver in which the ball incurs a large deformation, may subject the ball to an excessive rise in spin, shortening the distance of travel. On the other hand, a hot-molded article that is too soft deadens the feel of the golf ball when played, compromises the rebound of the ball, resulting in a shorter distance, and gives the ball a poor durability to cracking with repeated impact.

The golf ball of the invention has, as a constituent element, the above-described hot-molded article, but the construction of the ball is not subject to any particular limitation. Examples of suitable golf ball constructions include one-piece golf balls in which the hot-molded article is itself used directly as the golf ball, solid two-piece golf balls wherein the hot-molded article serves as a solid core on the surface of which a cover has been formed, solid multi-piece golf balls made of three or more pieces in which the hot-molded article serves as a solid core over which a cover composed of two or more layers has been formed, thread-wound golf balls in which the hot-molded article serves as the center core, and multi-piece golf balls in which the hot-molded article serves as an intermediate layer or outermost layer that encloses a solid core. Solid two-piece golf balls and solid multi-piece golf balls in which the hot-molded article serves as a solid core are preferred because such golf ball constructions are able to exploit most effectively the characteristics of the hot-molded article.

In the practice of the invention, when the hot-molded article serves as a solid core, it is recommended that the solid core have a diameter of at least 30.0 mm, preferably at least 32.0 mm, more preferably at least 35.0 mm, and most preferably at least 37.0 mm, but not more than 41.0 mm, preferably not more than 40.5 mm, more preferably not more than 40.0 mm, and most preferably not more than 39.5 mm.

In particular, it is recommended that such a solid core in a solid two-piece golf ball have a diameter of at least 37.0 mm, preferably at least 37.5 mm, more preferably at least 38.0 mm, and most preferably at least 38.5 mm, but not more than 41.0 mm, preferably not more than 40.5 mm, and more preferably not more than 40.0 mm.

Similarly, it is recommended that such a solid core in a solid three-piece golf ball have a diameter of at least 30.0 mm, preferably at least 32.0 mm, more preferably at least 34.0 mm, and most preferably at least 35.0 mm, but not more than 40.0 mm, preferably not more than 39.5 mm, and even more preferably not more than 39.0 mm.

It is also recommended that the solid core have a specific gravity of at least 0.9, preferably at least 1.0, and more preferably at least 1.1, but not more than 1.4, preferably not more than 1.3, and more preferably not more than 1.2.

When a solid two-piece golf ball or a solid multi-piece golf ball is formed using the hot-molded article in the invention as the core, use may be made of known cover and intermediate layer materials. These cover and intermediate layer materials may be primarily composed of, for example, a thermoplastic or thermoset polyurethane elastomer, a polyester elastomer, an ionomer resin, a polyolefin elastomer or a mixture thereof. The use of a thermoplastic polyurethane elastomer or an ionomer resin is especially preferred. Any one or mixture of two or more thereof may be used. When a golf ball is formed using the hot-molded article in the invention as an intermediate layer or outermost layer enclosing a solid core, use can be made of a known core material and a known intermediate layer material or cover material.

Illustrative examples of thermoplastic polyurethane elastomers that may be used for the above purpose include commercial products in which the diisocyanate is an aliphatic or aromatic compound, such as Pandex T7298, Pandex T7295, Pandex T7890, Pandex TR3080, Pandex T8295 and Pandex T8290 (all manufactured by DIC Bayer Polymer, Ltd.). Illustrative examples of suitable commercial ionomer resins include Surlyn 6320 and Surlyn 8120 (both products of E.I. du Pont de Nemours and Co., Inc.), and Himilan 1706, Himilan 1605, Himilan 1855, Hilmilan 1601 and Hilmilan 1557 (all products of DuPont-Mitsui Polychemicals Co., Ltd.).

The cover material may include also, as an optional ingredient, a polymer other than the foregoing thermoplastic elastomers. Specific examples of polymers that may be included as optional ingredients include polyamide elastomers, styrene block elastomers, hydrogenated polybutadienes and ethylene-vinyl acetate (EVA) copolymers.

The above-described solid two-piece golf balls and solid multi-piece golf balls can be manufactured by a known method. When manufacturing solid two-piece and solid multi-piece golf balls, suitable use can be made of a known method in which the above-described hot-molded article is placed as the solid core within a given injection mold, following which a predetermined technique is used to inject the above-described cover material over the core in the case of a solid two-piece golf ball, or to successively inject the above-described intermediate layer material and cover material in the case of a solid multi-piece golf ball. In some cases, the golf ball may be produced by molding the cover material under an applied pressure.

It is recommended that the intermediate layer in a solid multi-piece golf ball have a thickness of at least 0.5 mm, and preferably at least 1.0 mm, but not more than 3.0 mm, preferably not more than 2.5 mm, more preferably not more than 2.0 mm, and most preferably not more than 1.6 mm.

Moreover, in both solid two-piece golf balls and solid multi-piece golf balls, it is recommended that the cover have a thickness of at least 0.7 mm and preferably at least 1.0 mm, but not more than 3.0 mm, preferably not more than 2.5 mm, more preferably not more than 2.0 mm, and most preferably not more than 1.6 mm.

The golf ball of the invention can be manufactured for competitive use by imparting the ball with a diameter and weight which conform with the Rules of Golf; that is, a diameter of not less than 42.67 mm and a weight of not more than 45.93 g. It is recommended that the diameter be not more than 44.0 mm, preferably not more than 43.5 mm, and most preferably not more than 43.0 mm; and that the weight be at least 44.5 g, preferably at least 45.0 g, more preferably at least 45.1 g, and most preferably at least 45.2 g.

EXAMPLES

The following Examples and Comparative Examples are provided by way of illustration and not by way of limitation.

Examples 1 to 5, Comparative Examples 1 to 5

In each example and comparative example, the starting materials shown in Tables 1 and 2 below were blended in the indicated proportions within a kneader to prepare a rubber composition, which was then vulcanized at 160° C. for 20 minutes in a spherical mold, thereby giving a 37.7 mm diameter spherical molded article weighing 32 g.

The physical properties of these molded articles were evaluated. The results are shown in Tables 1 and 2 below.

TABLE 1

| Product No. | $T_{80}$ | Example | | | Comparative Example | | |
|---|---|---|---|---|---|---|---|
| | | 1 | 2 | 3 | 1 | 2 | 3 |
| Formulation | | | | | | | |
| EC140 | 2.3 | 100 | 75 | 40 | | | |
| BR01 | 8.4 | | 25 | 60 | 100 | | |
| BR11 | 4.9 | | | | | 100 | |
| BR1207 | 9.1 | | | | | | 100 |
| ZDA | | 27 | 27 | 27 | 27 | 27 | 27 |
| ZnO | | 18.3 | 18.3 | 18.3 | 18.3 | 18.3 | 18.3 |
| Antioxidant | | 0.2 | 0.2 | 0.2 | 0.2 | 0.2 | 0.2 |
| PO-D | | 0.4 | 0.4 | 0.4 | 0.4 | 0.4 | 0.4 |
| Zn PCTP | | | | | | | |
| DPDS | | | | | | | |
| Results | | | | | | | |
| Core load hardness | | 3.8 | 4.0 | 4.3 | 4.4 | 4.2 | 4.2 |
| Core initial velocity index | | 1 | 0.999 | 0.992 | 0.989 | 0.991 | 0.990 |

TABLE 2

| Product No. | $T_{80}$ | Example | | Comparative Example | |
|---|---|---|---|---|---|
| | | 4 | 5 | 4 | 5 |
| Formulation | | | | | |
| EC140 | 2.3 | 100 | 100 | | |
| BR01 | 8.4 | | | 100 | 100 |
| BR11 | 4.9 | | | | |
| BR1207 | 9.1 | | | | |
| ZDA | | 27 | 27 | 27 | 27 |
| ZnO | | 18.3 | 18.3 | 18.3 | 18.3 |
| Antioxidant | | 0.2 | 0.2 | 0.2 | 0.2 |
| PO-D | | 0.4 | 0.4 | 0.4 | 0.4 |
| Zn PCTP | | 1 | | 1 | |
| DPDS | | | 1 | | 1 |
| Results | | | | | |
| Core load hardness | | 4.2 | 4.2 | 5.0 | 4.9 |
| Core initial velocity index | | 1.011 | 1.006 | 1.003 | 0.999 |

EC140: A polybutadiene produced by Firestone Polymers (polymerized with a neodymium catalyst). $T_{80}$ value: 2.3.
BR01: A polybutadiene produced by JSR Corporation (polymerized with a nickel catalyst). T80 value: 8.4.
BR11: A polybutadiene produced by JSR Corporation (polymerized with a nickel catalyst). T80 value: 4.9.
BR1207: A polybutadiene produced by Goodyear (polymerized with a nickel catalyst). T80 value: 9.1.
ZDA: Zinc acrylate, produced by Nippon Shokubai Co., Ltd.
ZnO: Zinc oxide, produced by Sakai Chemical Industry Co., Ltd. Average particle size, 0.6 μm (air permeametry); specific surface area, 3.5 m$^2$/g (BET technique).
Antioxidant: NS-6, made by Ouchi Shinko Chemical Industry Co., Ltd.
PO-D: Dicumyl peroxide, made by NOF Corporation.
Zn PCTP: Zinc salt of pentachlorothiophenol.
DPDS: Diphenyldisulfide.

Core Load Hardness

Deflection (mm) when subjected to loading from an initial load of 98 N (10 kgf) to a final load of 1275 N (130 kgf).

Core Initial Velocity Index

The initial velocity was measured with an initial velocity measuring apparatus of the same type as that of the USGA--the official golf ball regulating body, and was represented as a ratio based on the value obtained in Example 1.

The invention claimed is:

1. A golf ball, comprising, as a constituent element, an article molded under heat from a rubber composition comprised of: (a) a base rubber containing polybutadiene having a stress relaxation time ($T_{80}$), defined as the time in seconds from the moment when rotor rotation is stopped immediately after measurement of the $ML_{1+4}$ (100° C.) value (the Mooney viscosity measured at 100° C. in accordance with ASTM D-1646-96) that is required for the $ML_{1+4}$ value to decrease 80%, of at most 3.5, (b) an unsaturated carboxylic acid and/or a metal salt thereof, and (c) an organic peroxide,
wherein the polybutadiene having a stress relaxation time ($T_{80}$) of at most 3.5 is a polybutadiene prepared using a rare-earth catalyst.

2. The golf ball of claim 1, wherein the rubber composition additionally comprises (d) an organosulfur compound.

3. The golf ball of claim 1, wherein the polybutadiene having a stress relaxation time ($T_{80}$) of at most 3.5 accounts for at least 40 wt % of the base rubber.

4. The golf ball of claim 1, wherein the polybutadiene having a stress relaxation time ($T_{80}$) of at most 3.5 is a polybutadiene prepared by polymerization using a rare-earth catalyst, followed by terminal modification.

5. The golf ball of claim 1, wherein the article molded under heat from the rubber composition has a hardness difference, obtained by subtracting the JIS-C hardness at the center of the hot-molded article from the JIS-C hardness at the surface of the article, of at least 15, but not more than 50.

* * * * *